United States Patent [19]

Feeney

[11] Patent Number: 4,867,770

[45] Date of Patent: Sep. 19, 1989

[54] FILTER CARTRIDGE

[75] Inventor: John R. Feeney, Wigan, United Kingdom

[73] Assignee: Protector Safety Limited, Wigan, United Kingdom

[21] Appl. No.: 191,833

[22] Filed: May 9, 1988

Related U.S. Application Data

[63] Continuation of Ser. No. 9,941, filed as PCT GB86/00306 on Jun. 2, 1986, published as WO86/06979 on Dec. 4, 1986, abandoned.

[30] Foreign Application Priority Data

Jan. 6, 1985 [GB] United Kingdom ............... 8513866

[51] Int. Cl.⁴ ............................................ B01D 53/04
[52] U.S. Cl. ........................................ 55/316; 55/387; 55/475; 55/513; 55/517; 55/DIG. 33; 422/122
[58] Field of Search ................. 55/316, 387, 475, 507, 55/513, 516–519, DIG. 33; 422/122, 169, 179, 221, 311; 210/446, 451, 477

[56] References Cited

U.S. PATENT DOCUMENTS

| | | | |
|---|---|---|---|
| 2,065,658 | 12/1936 | Compton | 210/451 X |
| 2,381,354 | 8/1945 | Larson | 55/316 X |
| 2,400,719 | 5/1946 | Stackhouse | 55/519 X |
| 2,577,606 | 12/1951 | Conley | 55/507 X |
| 2,593,132 | 4/1952 | Gannon | 55/316 X |
| 2,671,528 | 3/1954 | Gross | 55/316 |
| 2,682,315 | 6/1954 | Evans | 55/518 |
| 2,728,407 | 12/1955 | Squier | 55/516 X |
| 2,744,523 | 5/1956 | Malcom, Jr. et al. | 55/316 X |
| 2,787,333 | 4/1957 | Boone et al. | 55/316 |
| 2,825,424 | 3/1958 | Grass | 55/316 |
| 2,845,138 | 7/1958 | Gageby | 55/316 X |
| 3,029,581 | 4/1962 | Robbins | 55/316 |
| 3,080,977 | 3/1963 | Jones | 55/316 X |
| 3,142,549 | 7/1964 | Klusewitz et al. | 55/316 |
| 3,353,339 | 11/1967 | Walter | 55/316 |
| 3,944,403 | 3/1976 | Simpson et al. | 55/316 |
| 3,954,625 | 5/1976 | Michalski | 210/451 X |
| 3,976,457 | 8/1976 | Martin | 55/270 |
| 4,026,685 | 5/1977 | Grix | 55/316 X |
| 4,064,876 | 12/1977 | Mulchi | 55/316 X |
| 4,109,464 | 8/1978 | Wickland | 55/316 X |
| 4,141,703 | 2/1979 | Mulchi | 55/316 |
| 4,229,306 | 10/1980 | Hein et al. | 210/451 X |
| 4,381,929 | 5/1983 | Mizuno et al. | 55/316 |
| 4,386,947 | 6/1983 | Mizuno et al. | 55/316 X |
| 4,543,112 | 9/1985 | Ackley et al. | 55/316 |
| 4,548,626 | 10/1985 | Ackley et al. | 55/316 |
| 4,559,066 | 12/1985 | Hunter et al. | 55/316 X |

FOREIGN PATENT DOCUMENTS

| | | | |
|---|---|---|---|
| 674562 | 3/1939 | Fed. Rep. of Germany | 55/DIG. 33 |
| 2304990 | 8/1973 | Fed. Rep. of Germany | 55/513 |

Primary Examiner—Robert Spitzer
Attorney, Agent, or Firm—Pravel, Gambrell, Hewitt, Kimball & Krieger

[57] ABSTRACT

A filter cartridge incorporates a layer of granular material (4d) for adsorbing gases and/or vapors retained in position by porous retaining elements (4e, 4f, 4g). The cartridge includes a housing (2) and a closure element (3) for closing the housing. The closure element (3) is associated with a compression element (10) which during assembly of the closure (3) on the housing (2) acts against the retaining elements (4e, 4f, 4g) to compress the granular material (4).

13 Claims, 3 Drawing Sheets

FILTER CARTRIDGE

This application is a continuation of application Ser. No. 9,941, filed as PCT GB86/00306 on Jun. 2, 1986, published as WO86/06979 on Dec. 4, 1986, now abandoned.

The present invention relates to a filter cartridge such as may be incorporated in a mask to be worn by personnel operating in hazardous industrial environments, the cartridge serving to remove harmful gases/vapours from air to be inhaled by the user.

Filter cartridges for fulfilling the above function are already known and comprise a layer of granular carbon (for adsorbing harmful gases/vapours) and frequently also a filter element (usually of glass-fibre paper) for removing particulate matter. At least one porous retaining element is provided between the carbon and the filter element for retaining the carbon in position. However, the known cartridges are relatively complicated to manufacture. Thus one known cartridge is produced by introducing the carbon and the porous element into a cylindrical metal housing followed by rolling a circumferential groove in the outside of the housing so that an inner circumferential ridge is formed to retain the porous element in position. Subsequently, the filter element for removing particulate matter is introduced into the housing, located in position by an O-ring seal provided between the housing and the peripheral edge of the filter element a grill is provided on top of the filter element, and the top of the housing is turned over to form a lip to retain the grill and filter element in position.

It is an object of the present invention to provide a filter cartridge which is of simplified construction as compared to the prior art cartridges.

According to the present invention there is provided a filter cartridge incorporating a layer of granular material for adsorbing gases and/or vapours retained in position by a porous retaining element, the cartridge having an air inlet and an air outlet to allow passage of air through the cartridge, the cartridge comprising a housing and a closure element closing the housing, the closure element being associated with a compression element which during assembly of the closure element on the housing acts against the retaining element to compress the granular material.

The filter cartridge preferably also includes a filter element for the removal of particulate matter.

Preferably the compression element is a flange provided around the closure element and located within the housing. Preferably also this filter element for particulate material (when used) is located within the bounds of said flange.

The invention will be further described by way of example only with reference to the accompanying drawings, in which.

Figure 1:
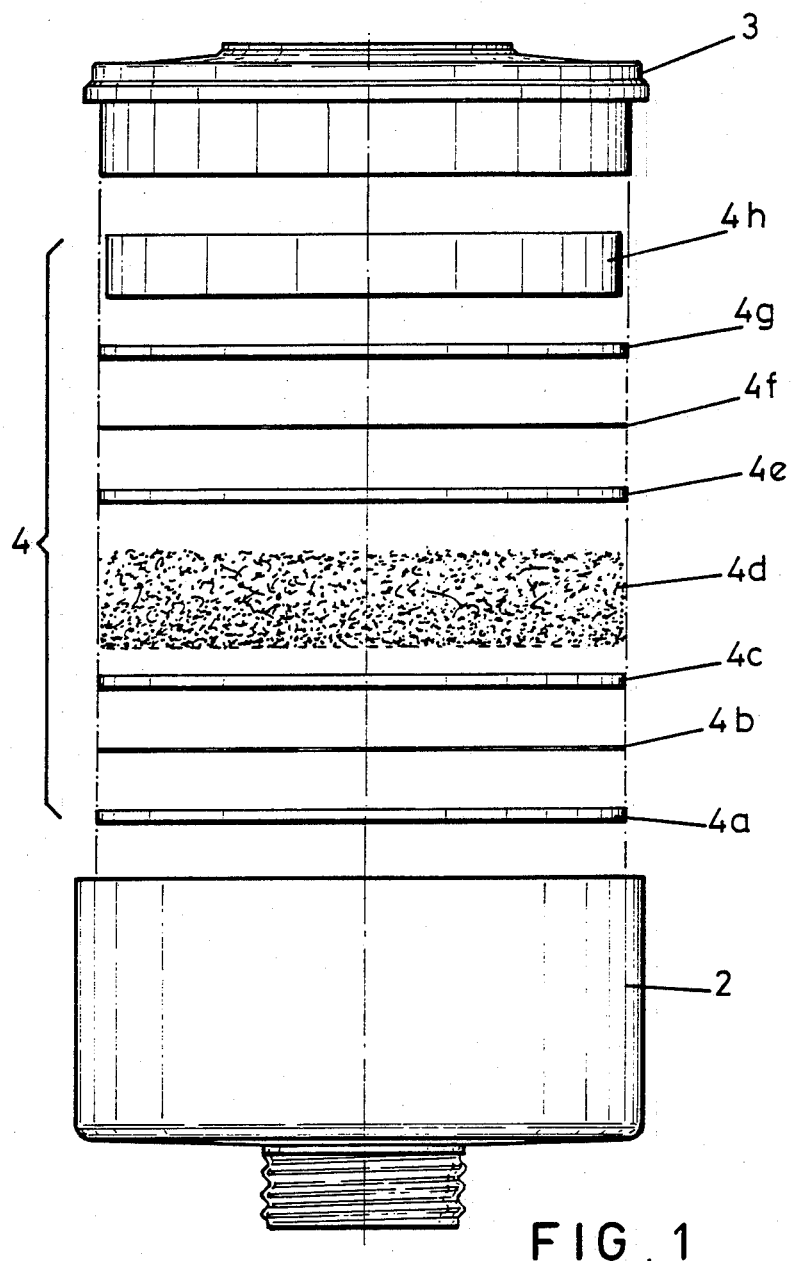
FIG. 1 is an exploded view of one embodiment of filter cartridge in accordance with the invention.

Referring to FIG. 1, the illustrated cartridge 1 comprises a plastics housing 2, a plastics closure element 3, and an arrangement 4 of filter elements which will be described in more detail below.

Figure 2:
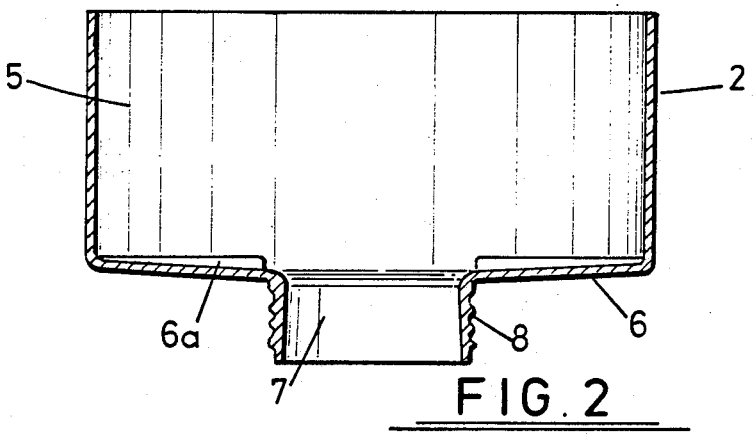
FIG. 2 is a sectional view of the housing of the cartridge shown in FIG. 1.

Housing 2 is illustrated in FIG. 2 and will be seen to comprise an open-topped generally cylindrical body 5 with a base 6 in which is an aperture 7 bounded by a screw-threaded abutment 8. Base 6 slopes slightly (e.g. at 2½°) from body 5 to aperture 7 and fins 6a are provided on the base 6 to provide a level support for filter elements 4.

Figure 4:
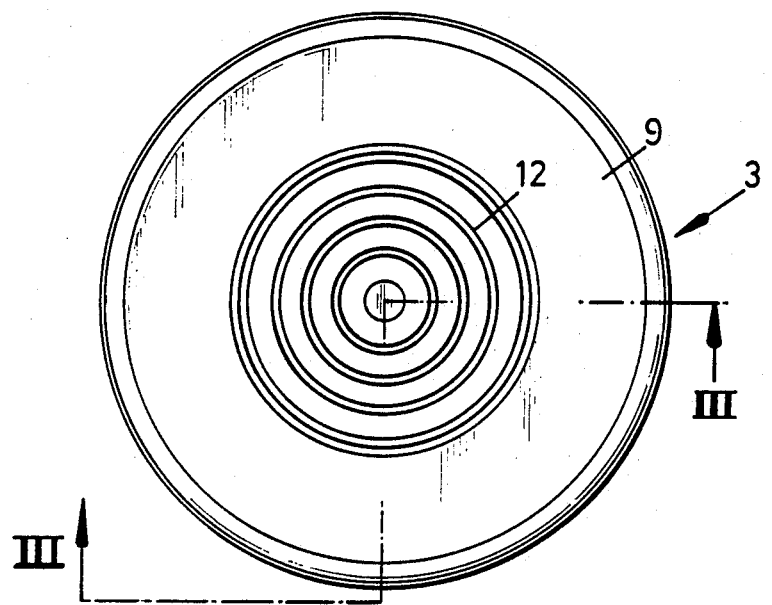
FIG. 4 is a top plan view of the closure element shown in FIG. 3.
Figure 3:
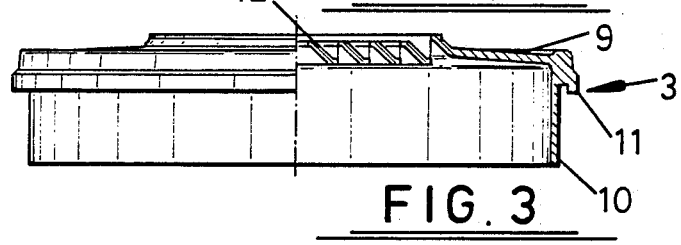
FIG. 3 is a part sectional view (on the line III—III of FIG. 4) of the closure element of the cartridge shown in FIG. 1.
Figure 5:
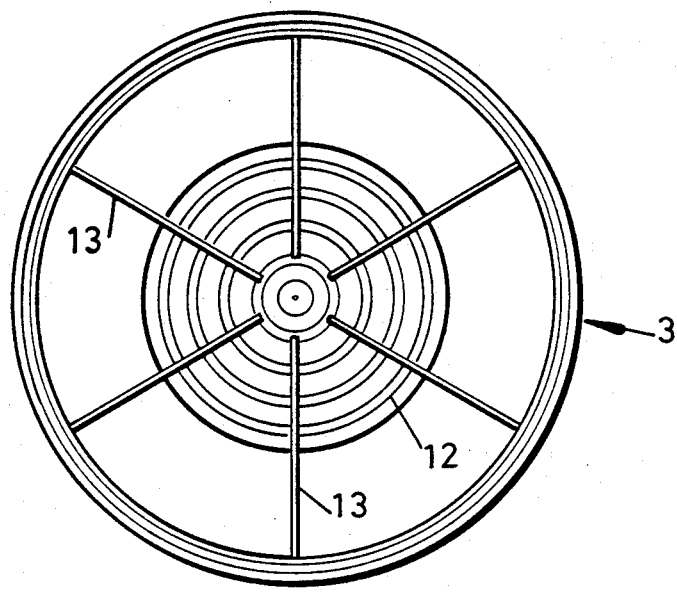
FIG. 5 is an underside plan view of the closure element shown in FIG. 3.
Figure 6:
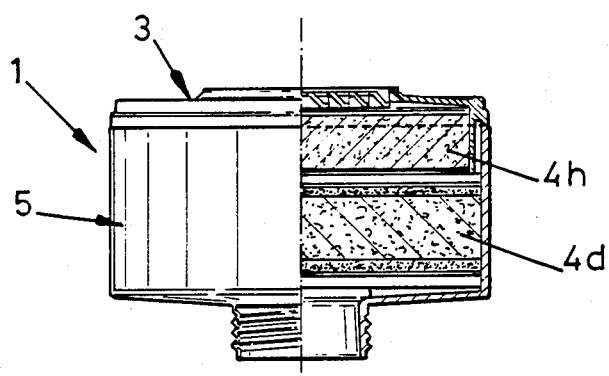
FIG. 6 is a sectional view of the assembled cartridge.

Closure element 3 is illustrated in FIGS. 3 to 5 and will be seen to comprise a generally circular top portion 9, a first annular flange 10 provided generally around, but slightly inwardly of, the peripheral edge region of top portion 9, and a second annular flange 11 encircling flange 10. As will be seen from FIG. 3, flange 10 is of greater height than flange 11, for reasons which will be described. Additionally, the outer diameter of flange 10 is slightly less than the inner diameter of body 5 of housing 2 whereas the inner and outer diameters of flange 11 correspond to those of the body 5.

Top portion 9 has a central aperture in which is provided a grill formation defined by plurality of circular grill elements 12 held in concentric spaced apart relationship by a plurality of radially disposed ribs 13 on the undersurface of top portion 9 (see FIG. 5).

The filter elements 4 to be incorporated in the cartridge comprise a plastics grille 4a, a filter paper 4b, a layer of foam material 4c, particulate carbon 4d, a further layer of foam material 4e, a further filter paper 4f, a further grille 4g, and a pleated glass-fibre paper filter element 4h. Although not detailed in the drawings, filter element 4h is of generally disc-like configuration and comprises radially fluted filter paper. It should be noted that the axial thickness of filter element 4h is less than the height of flange 10.

Assembly of the filter cartridge 1 is as follows.

Firstly, filter element 4h is positioned within flange 10 such that the flange 10 projects a short distance (say 1 mm) beyond the filter element 4h. The peripheral edge of filter element 4h is then bonded to the inner surface of flange 10.

Next, filter elements 4a to 4g are positioned in housing 2 in the order shown in FIG. 1, it being noted that the carbon 4d is added in granular form rather than in the form of a cartridge.

Subsequently, the closure element 3 is positioned on housing 2 with the flange 10 locating within the body 5. Closure element 3 is pushed into housing 2 until flange 11 abuts against the rim of body 5. During this operation, the lower edge of flange 10 compresses the assembly of filter elements 4a–4g so that they are firmly located in housing 2. Since this compression is effected by the flange 10, no stress is placed on the fluted filter element 4h.

Simultaneously with the end of the abovedescribed pressing operation, flange 11 is bonded to the body 5 to complete assembly of cartridge 1. This bonding may be by means of adhesive or may be a 'welding' type operation. Thus, when the housing 2 and closure element are of crystalline plastics material they may be ultrasonically welded together. In the case of polyolefins (e.g. polyethylene) the components may be hot plate welded together.

Alternatively, induction welding may be used. This consists of inserting a conductive ring between the housing and the closure element and then inductively heating the ring.

A number of modifications may be made to the above-described assembly procedure. For example, after introduction of the grille 4g into the housing, this grille 4g may be pressed downwardly (by means not shown) to effect a pre-compression of carbon 4b. Alternatively or additionally, after introduction of the grille 4g, the top rim of the housing 2 may be 'sliced' off so as to ensure that, for all cartridges, the distance between grill 4g and the upper rim of housing is constant.

A number of modifications may be made to the illustrated construction. Thus, for example, the undersurface of top portion 9 may be provided with a projecting finger of the same height as flange 10. This finger will locate through an aperture (not shown) in the centre of filter element 4h and will assist in the abovedescribed pressing operation. Alternatively or additionally, a water repellant gauze may be provided between the filter element 4h and the top portion 9 of closure element 3 to prevent water entering through the grill in the closure element entering the element 4h.

I claim:

1. A filter cartridge comprising:
   a cylindrical housing having a uniform inner cross-section and having an air outlet for the cartridge, said housing being fabricated from plastic,
   a layer of carbon for adsorbing gases or vapours provided in the housing,
   first and second porous retaining means provided within the housing respectively on the opposite sides of said carbon and serving to retain said carbon in position, said first porous retaining means being positioned on that side of the carbon opposite to the outlet in the housing while allowing axial movement of said first porous retaining means during assembly of the cartridge, said second porous retaining means being firmly seated in the housing,
   a closure element including a cover portion having an air inlet for the cartridge for closing the housing, said closure element being fabricated from plastic,
   said closure element having a cylindrical flange extending away from said cover portion towards said air outlet of the housing, said cylindrical flange being pressed within the housing and defining a tubular compression element open at its end remote from the cover portion,
   said closure element having means radially outwards of the cylindrical flange engaging against the housing to limit the insertion of the element into the housing during assembly of the cartridge whilst allowing the lower edge of the compression element to act against the first porous retaining means to compress the carbon,
   a filter element located in said tubular compression element for removing particulate matter, said filter element having been located therein by insertion through the open end of the compression element, and
   said closure element being bonded to the housing upon completion of assembly of the cartridge to operably provide a filter cartridge for use with a respirator mask.

2. A filter cartridge as claimed in claim 1 wherein the compression element projects beyond the filter element for particulate matter.

3. A filter cartridge as claimed in claim 1 wherein the closure element has a second flange positioned outwardly of the cylindrical flange, and the undersurface of said second flange acts against the rim of the cylindrical housing to provide said means for limiting the insertion of the cylindrical flange into the housing.

4. A filter cartridge as claimed in claim 1 wherein the closure element has a centrally positioned projection on the same side as said cylindrical flange and being of the same height thereof, said projection serving as an additional compression element.

5. A cartridge as claimed in claim 1 wherein the inlet is provided as a grill formation in said closure element.

6. A cartridge as claimed in claim 1 wherein the first porous retaining means comprises a layer of foam material, a filter paper and a plastic grill.

7. A cartridge as claimed in claim 6 wherein the layer of foam material is adjacent the carbon and the filter paper is sandwiched between the layer of foam material and the plastic grill.

8. A cartridge as claimed in claim 1 wherein the second porous retaining means comprises a layer of foam material, a filter paper and a plastic grill.

9. A cartridge as claimed in claim 8 wherein the layer of foam material is adjacent the carbon and the filter paper is sandwiched between the layer of foam material and the plastic grill.

10. A cartridge as claimed in claim 1 wherein the base of the housing slopes downwardly towards said outlet, and said base has a plurality of circumferentially spaced ribs defining a level support for the second porous retaining means.

11. A cartridge as claimed in claim 1 wherein the closure element has been bonded to the housing by a welding technique.

12. A cartridge as claimed in claim 11 wherein the closure element has been bonded to the housing by induction welding.

13. A filter cartridge comprising:
    a cylindrical housing having an air outlet for the cartridge,
    a layer of granular material for adsorbing gases or vapours provided in the housing,
    first and second porous retaining means provided within the housing respectively on the opposite sides of said granular material and serving to retain said granular material in position, said first porous retaining means being on that side of the granular material opposite to the outlet and, during assembly of the cartridge, being axially movable within the housing,
    a closure element including a cover portion having an air inlet for the cartridge for closing the housing, said inlet is provided as a grill formation in said closure element, said grill formation is defined by a central aperture in the cover portion and a plurality of circular grill elements held in concentric spaced apart relationship within the aperture by a plurality of radially disposed ribs on the undersurface of the cover portion,
    said closure element having a cylindrical flange extending away from said cover portion towards said air outlet of the housing, said cylindrical flange being located within the housing and defining a tubular compression element open at its end remote from the cover portion,
    said closure element having means radially outwards of the cylindrical flange engaging against the housing to limit the insertion of the element into the housing during assembly of the cartridge whilst allowing the lower edge of the compression element to act against the first porous retaining means to compress the granular material, and
a filter element located in said tubular compression element for removing particulate matter, said filter element having been located therein by insertion through the open end of the compression element.

* * * * *